United States Patent
Blaicher et al.

(10) Patent No.: US 8,645,331 B2
(45) Date of Patent: *Feb. 4, 2014

(54) CASCADE DELETE PROCESSING

(75) Inventors: Christopher Y. Blaicher, Austin, TX (US); Kerry C. Tenberg, Austin, TX (US); Randol Keith Bright, Austin, TX (US)

(73) Assignee: BMC Software, Inc., Houston, TX (US)

( * ) Notice: Subject to any disclaimer, the term of this patent is extended or adjusted under 35 U.S.C. 154(b) by 733 days.

This patent is subject to a terminal disclaimer.

(21) Appl. No.: 12/647,823

(22) Filed: Dec. 28, 2009

(65) Prior Publication Data

US 2010/0100533 A1    Apr. 22, 2010

Related U.S. Application Data (63) Continuation of application No. 10/871,240, filed on Jun. 18, 2004, now Pat. No. 7,664,790.

(51) Int. Cl.
 *G06F 7/00*  (2006.01)
 *G06F 17/00* (2006.01)

(52) U.S. Cl.
 USPC ............................ 707/691; 707/602; 707/692

(58) Field of Classification Search
 USPC .......................................... 707/602, 691, 692
 See application file for complete search history.

(56) References Cited

U.S. PATENT DOCUMENTS

| | | | |
|---|---|---|---|
| 4,933,848 A * | 6/1990 | Haderle et al. ........................ | 1/1 |
| 4,947,320 A | 8/1990 | Crus et al. | |
| 5,133,068 A * | 7/1992 | Crus et al. ............................. | 1/1 |
| 5,499,359 A * | 3/1996 | Vijaykumar .................. | 707/696 |
| 5,706,494 A | 1/1998 | Cochrane et al. | |
| 5,745,896 A | 4/1998 | Vijaykumar | |
| 6,009,425 A * | 12/1999 | Mohan .................................. | 1/1 |
| 6,098,075 A | 8/2000 | Becraft et al. | |
| 6,163,783 A | 12/2000 | Hintz et al. | |
| 6,189,010 B1 | 2/2001 | Isip, Jr. | |
| 6,295,539 B1 | 9/2001 | Isip, Jr. | |
| 6,304,876 B1 | 10/2001 | Isip, Jr. | |
| 6,427,143 B1 | 7/2002 | Isip et al. | |
| 6,453,314 B1 | 9/2002 | Chan et al. | |
| 6,466,942 B1 * | 10/2002 | Tolkin .................................. | 1/1 |
| 6,714,943 B1 * | 3/2004 | Ganesh et al. ........................ | 1/1 |
| 7,251,650 B2 | 7/2007 | Jin et al. | |

OTHER PUBLICATIONS

Gennick et al., "Oracle SQL Loader: The Definitive Guide", O'Reilly Publisher, Apr. 2001.*

* cited by examiner

*Primary Examiner* — Shew-Fen Lin (57) ABSTRACT

A time-efficient means for identifying and processing cascading deletes due to referential constraint violations includes: logging, to an error file, all primary key ("PK") errors detected during table load operations; building a foreign key ("FK") index for each child table; recursively probing each relevant FK index to identify all loaded rows that violate a referential constraint due to a PK error; logging all identified FK errors to the error file; and using the (preferably sorted) error file contents to identify, mark and physically delete table rows that violate a referential constraint. The described cascade delete processing methods make only a single pass through the table data, using ordinary computer files to track and organize rows identified for deletion. Use of error files rather than tablescans (multiple passes through the loaded table data) can provide a significant reduction in table load times, especially for large or intricately "related" tables.

27 Claims, 5 Drawing Sheets

CASCADE DELETE PROCESSING

CROSS-REFERENCE TO RELATED APPLICATIONS

This application is a continuation which claims priority to co-pending U.S. patent application Ser. No. 10/871,240, entitled "Cascade Delete Processing," filed 18 Jun. 2004 and which is hereby incorporated by reference in its entirety.

BACKGROUND

The invention relates generally to computer database systems and more particularly to processing referential integrity constraint violations resulting in cascading deletes during database load operations. The subject matter of the invention is generally related to the following jointly owned and co-pending patent application: "Constraint Processing" by Christopher Y. Blaicher, Kerry C. Tenberg and Randol K. Bright (Ser. No. 10/871,160) which is incorporated herein by reference in its entirety.

Virtually all modern DataBase Management Systems ("DBMS") provide mechanisms that permit users to constrain the value of one database entity based on the value or existence of another database entity. One common constraint type is the referential constraint. Referential constraints require that a value referred to by one database entity is associated with an existing entity in the database. In the context of the Structured Query Language ("SQL"), referential constraints are implemented through the use of Foreign Keys ("FK"), wherein a database entity's FK value must equate to the Primary Key ("PK") value of another, existing, database entity.

In general, constraint processing is preformed during database update and load operations and may be handled in accordance with one of three policies. In the first, deletion of a referenced entity is prohibited. This policy is often referred to as the "Reject Violating Modifications" policy. In the second, if a referenced entity is deleted or determined to be invalid then all entities that reference it are also deleted (or marked invalid). This policy is often referred to as the "Cascading" policy. In the third, FK values referencing a deleted or invalid PK value are set to NULL. This policy is often referred to as the "Set-Null" policy.

Consider, for example, a relational database entity (a table) such as that shown in Table 1. Under the Reject Violating Modifications policy, the entry associated with Employee-1 (row 1) could not be deleted because at least one other entry's FK references the entry. In the example of Table 1, in fact, two other entries (rows 2 and 3) are referentially constrained to the entry associated with Employee-1. Under the Cascading policy, if the entry associated with Employee-1 (row 1) was deleted or determined to be invalid during a load operation, those entries in rows 2 and 3 would become invalid because their FK would no longer refer to an existing/valid entry. Once the entry in row 2 is invalid, the entries in rows 4 and 5 become invalid because they too would have FK values associated with a non-existing or invalid PK value. Similarly, those entries in rows 77 and 97 become invalid. Thus, under the second policy above, only row 6 remains valid after deletion of the entry in row 1. Under the Set-Null policy, all illustrated entries except that of row 6 would have their FK value set to NULL.

TABLE 1

Illustrative Database Table Entity

| Row | Employee ID (PK) | Manager ID (FK) | Other Attributes |
|---|---|---|---|
| 1 | 1 | 1 | - Data - |
| 2 | 2 | 1 | - Data - |
| 3 | 3 | 1 | - Data - |
| 4 | 4 | 2 | - Data - |
| 5 | 5 | 2 | - Data - |
| 6 | 23 | 47 | - Data - |
| . | . | . | . |
| . | . | . | . |
| . | . | . | . |
| 77 | 37 | 5 | - Data - |
| . | . | . | . |
| . | . | . | . |
| . | . | . | . |
| 97 | 47 | 5 | - Data - |
| . | . | . | . |
| . | . | . | . |
| . | . | . | . |

Figures 2A, 2B:
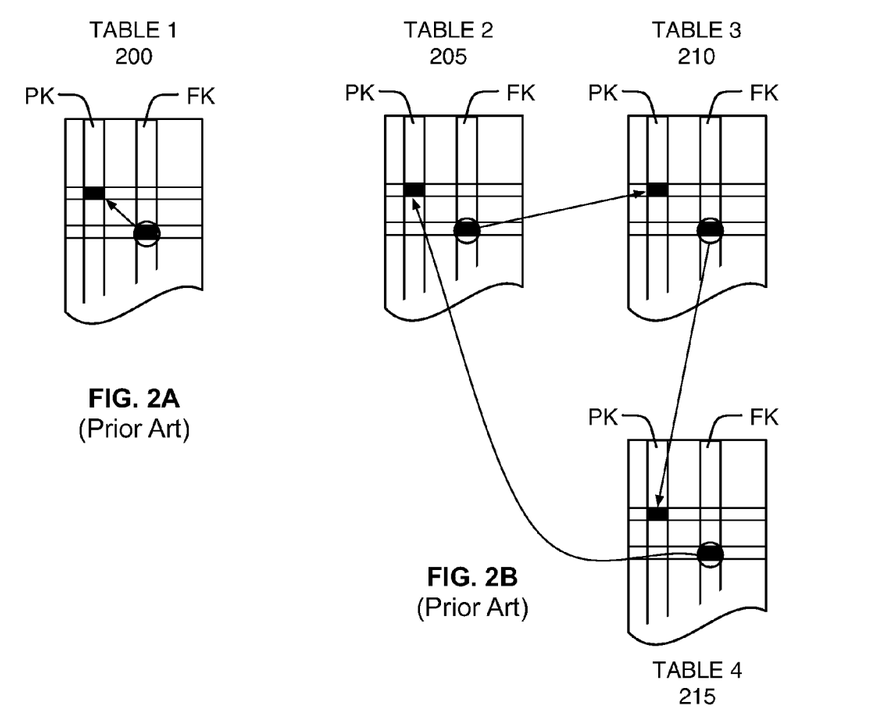

The situation in which one row (through failure to load or becoming invalid or deleted) causes a chain of one or more additional rows to become invalid is known as the "cascading delete" problem. It will be recognized by those of ordinary skill that the problem of cascading deletes only occur in self-referencing tables (see FIG. 2A) or when two or more tables are related through referential constraints to form a cycle (see FIG. 2B).

As illustrated by Table 1, both the Cascading and Set-Null policies require that when an entry is marked for deletion, or as invalid during a load operation, the effect of this action must be checked against all other entries in the affected entities (e.g., table or tables). It is for this reason that referential constraint checking can consume a large amount of time, particularly during database load operations and especially for large and/or heavily constrained entities.

Figure 1:
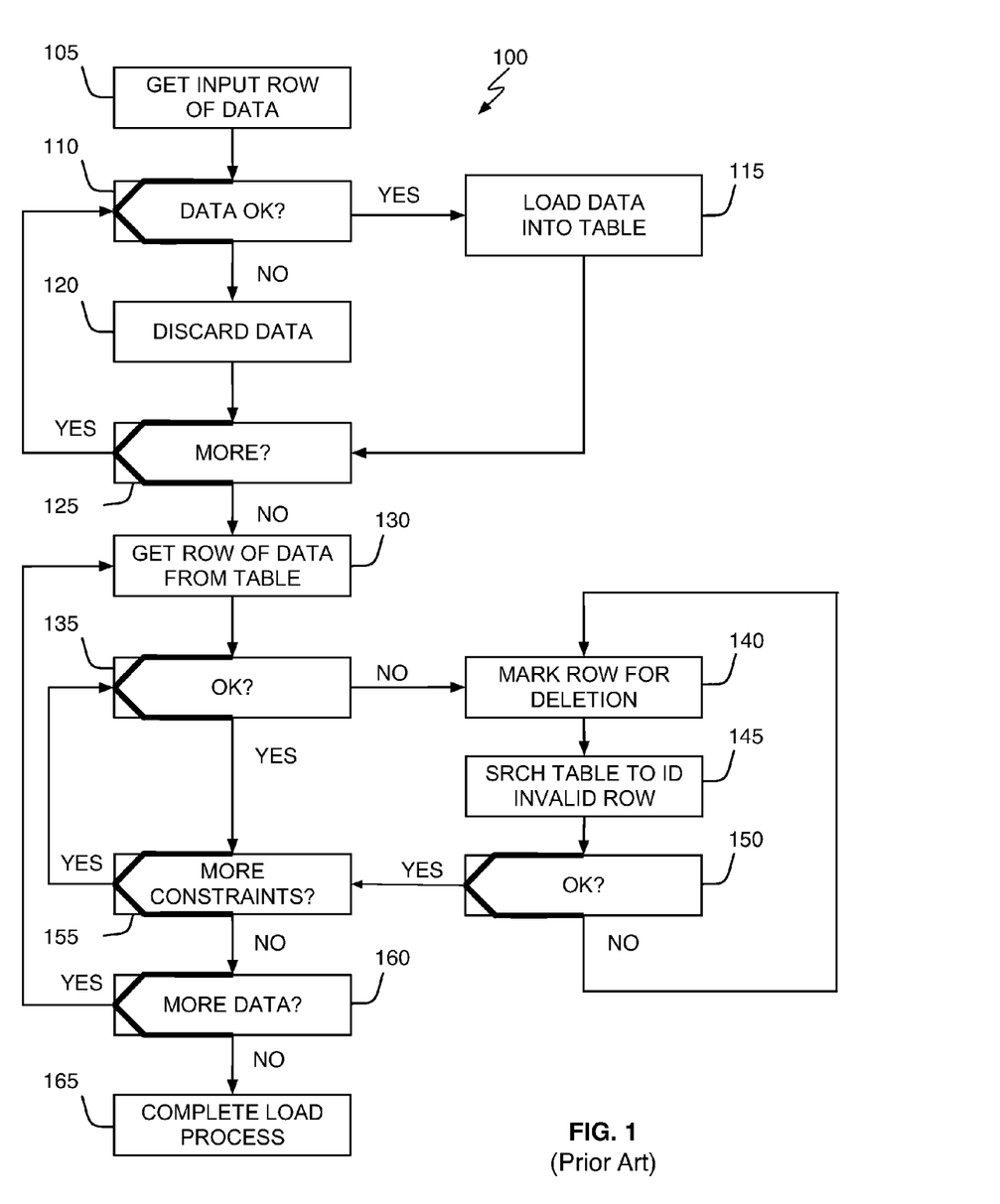
FIG. 1 shows, in flowchart format, a prior art database object load operation that incorporates referential constraint checking.

In the context of a relational database system and referential constraint processing in accordance with a Cascading policy, FIG. 1 shows prior art load-time referential integrity check operation 100 proceeds generally as follows. A first row of data is obtained (block 105) and its data is checked for validity. If all of the row's data is valid (the "Yes" prong of block 110), the data row is loaded into a table (block 115). If all of the data is not valid (the "No" prong of block 110), the row is not loaded into the table (block 120). In a modern DBMS such as DB2, a row rejected as invalid at this stage of the load process is also identified in a system log entry. Following the acts of blocks 115 and 120, if additional data remains to be checked/verified (the "Yes" prong of block 125), processing continues at block 110. If no additional data remains (the "No" prong of block 125), referential integrity check processing begins (block 130-155).

During referential constraint processing a first valid row is obtained from the loaded table (block 130) and a check is made to determine if its FK corresponds to a PK in a valid entry. If the entry's FK does not correspond to a valid PK entry, meaning the entry's referential constraint is violated (the "Yes" prong of block 135), the row is marked for deletion (block 140) and the entire table is checked to see if this change further invalidates additional row entries (block 145). Typically, as each new invalid row is identified (the "No" prong of block 150), it is marked for deletion (block 140). As illustrated in FIG. 1, the acts of blocks 140 through 150 are recursive in nature such that each entry (data row) marked as invalid or for deletion causes the entire table (or an index thereon) to be searched. Once all entries in the table have been checked (the "Yes" prong of block 150), a check is made to determine if additional constraints need to be checked. If additional constraints need to be verified (the "Yes" prong of block 155), processing resumes at block 135 where the particular constraint is checked. If all referential constraints have been checked (the "No" prong of block 155), a check is made to determine if additional data rows in the table remain to be checked. If additional data rows remain to be checked (the "Yes" prong of block 160), processing continues at block 130. If all valid rows have been checked (the "No" prong of block 160), the table is updated to remove all rows designated for deletion and made available to users of the DBMS (block 165).

One drawback to prior art techniques such as process 100 is the time required to process cascading deletes. As illustrated by blocks 140 and 145, each time a row is determined to be invalid (marked for deletion), the table is checked to determine what effect this has on other rows. Accordingly, the total time to load a table T(total) is the time required to physically load the data T(data) plus the time required to check a referential integrity constraint T(ref) multiplied by a function that depends upon the number of referential constraints (N), processed f(N):

$$T(\text{total}) = T(\text{data}) + [T(\text{ref}) \times f(N)]. \quad \text{EQ. 1}$$

In an operational DB2 database system, it has been found that the function f(N) is typically a low-order polynomial. For example, if the value of N is doubled, the value of f(N) may increase by a factor of 1.5 to 1.8.

It is clear from FIG. 1 that in situations where one invalid row causes additional rows to become invalid through failure to satisfy a referential constraint (creating "cascading deletes"), the prior art makes multiple passes through the table data (see discussion above regarding blocks 140-150)— requiring a processing time given by the [T(ref)×f(N)] term in EQ. 1. As the time to process even a single referential constraint in this manner can significantly increase a table's load time (especially for large tables and/or tables exhibiting highly "nested" or "layered" referential constraint relationships), it would be beneficial to provide methods and devices to efficiently load database objects in the face of cascading deletes.

SUMMARY

In one embodiment the invention provides a method to identify and process cascade deletes during relational database load operations. The method includes loading one or more tables into memory (each table having one or more rows, where at least one of the tables is a parent table and at least one of said tables is a child table), building a foreign key index for each loaded child table, logging all primary key errors detected during the act of loading, probing each relevant foreign key index to identify all loaded rows that violate a referential constraint due to a primary key error (where such referential constraint violation is a foreign key error), logging all identified foreign key errors to the error file and using the error file contents to identify, mark and delete loaded table rows that violate a referential constraint. The method may be stored in any media that is readable and executable by a computer system.

BRIEF DESCRIPTION OF THE DRAWINGS

FIG. 2 illustrates a self-referencing (2A) and cyclically related series of tables (2B) of the type that can generate cascading deletes.

DETAILED DESCRIPTION

Methods, systems and computer program storage devices to efficiently process cascading delete events due to referential constraint violations are described. The following embodiments of the invention, described in the context of a DB2® database system, are illustrative only and are not to be considered limiting in any respect. ("DB2" is a registered trademark of the International Business Machines Corporation of Armonk, N.Y.) Techniques in accordance with the invention use index probes and an error log file to identify and track referential dependencies between data elements (e.g., table rows) such that cascading deletes are identified in a single-pass through the data. Thus, the time to process referential constraints in accordance with the invention is reduced to approximately the time it takes to load the data itself.

Figure 3:
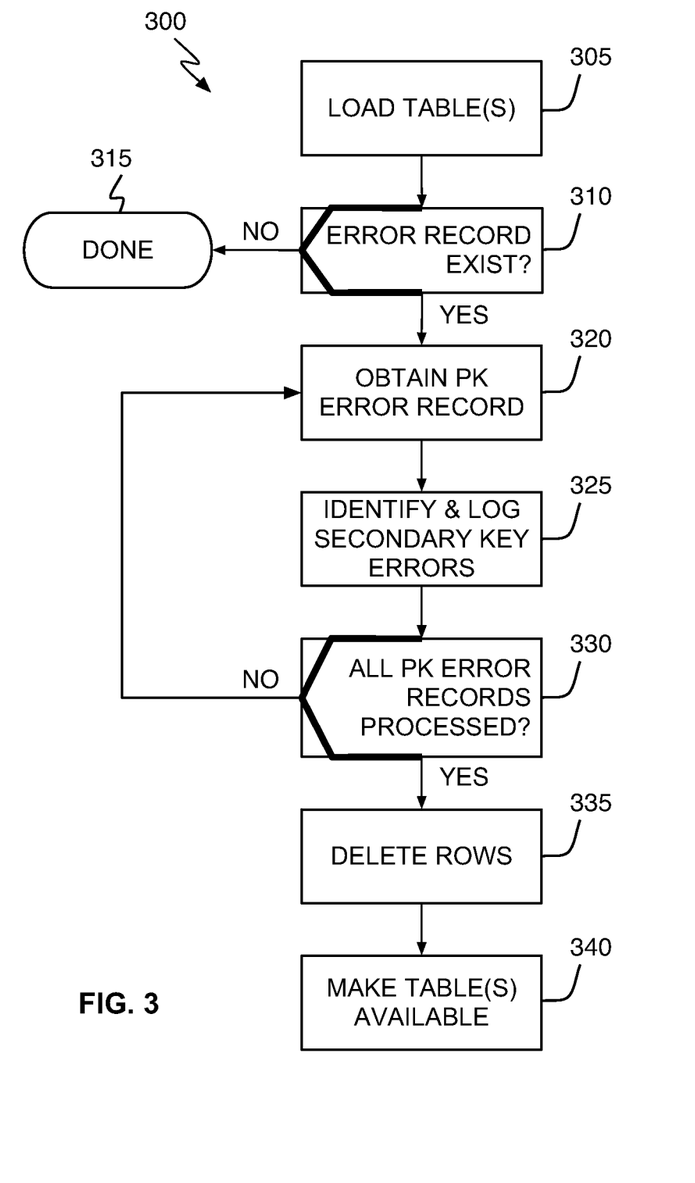
FIG. 3 shows, in flowchart format, a cascading delete processing method in accordance with one embodiment of the invention.

Referring to FIG. 3, cascade delete processing method 300 in accordance with one embodiment of the invention follows table load operations (block 305). Table load operations obtain data from storage (e.g., a tape or magnetic disk storage unit), and store or load the data into memory. During the acts of block 305, each row of data retrieved from storage is validated prior to loading it into memory. If any element of a row's data fails its data validation check, an error log is generated and the row containing the element is not loaded into memory. For example, if a table's schema defines column 'k' to be of type "date," and the data retrieved from storage corresponding to column 'k' fails to be formatted in an accepted date format, that data is considered invalid and the entire row is rejected—not loaded. Whenever a row's data fails this type of data validation, DBMS' generate or "log" an error record to a DBMS error file. Error records identify, inter alia, the table (via a table identifier, "TID"), the row (via a row identifier, "RID") and the type of error that caused the data to be rejected. In the context of the present discussion, rows rejected during initial load operations are referred to as primary key ("PK") errors. (One of ordinary skill in the art will recognize that other types of PK errors exist. For example, if one row's PK value is a duplicate of a previously loaded row's PK value (resulting in duplicate PK values), the second row is rejected as a "duplicate" and a PK error record is generated.) In accordance with the invention, if any child or dependent table being loaded during the acts of block 305 does not have a foreign key ("FK") index defined for it, a temporary FK index is built.

Next, the DBMS error file is checked to determine if any rows were rejected during the load operations of block 305 (block 310). If no PK failures were detected (the "No" prong of block 310), there is no potential for cascading deletes and method 300 ends (block 315). If one or more PK failures were logged during the acts of block 305 (the "Yes" prong of block 310), the first such error record is obtained and the PK of the rejected row is determined (block 320). The PK is then used to probe the FK index of each table that depends upon the table from which the PK error is associated and, should a referential constraint error be detected, a FK error record is logged to the error file. This process is repeated until all referential constraints of all rows affected by the initial PK error have been checked and logged to the DBMS error file (block 325). If all PK error records generated during the acts of block 305 have not been processed (the "No" prong of block 330), processing loops to block 320. If all PK error records generated during the acts of block 305 have been processed (the "Yes" prong of block 330), all of the logged FK error records are obtained from the DBMS error file and the rows associated therewith are deleted (block 335). The table(s) may then be made available to the DBMS for general access (block 340). It is significant to note that during cascade delete processing method 300 the loaded data is only processed once—at the time it is loaded into memory. Thereafter, referential constraint processing is carried out through index probes and error record logging. This is significant because the time required to log, sort and retrieve error records from an error log file can be substantially less than the time required to make multiple passes through the data itself—especially for large tables.

Figure 4:
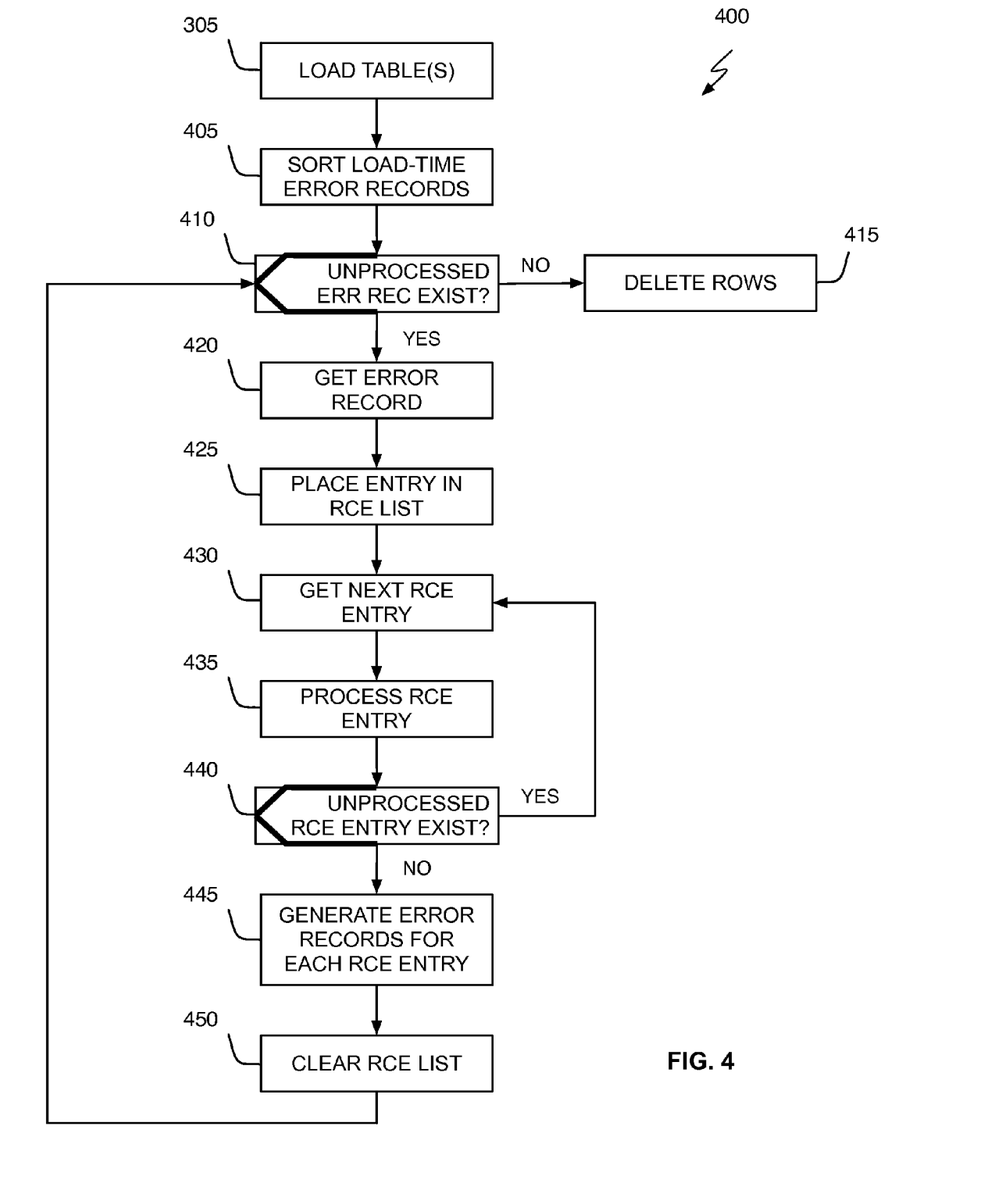
FIGS. 4, 5 and 6 show, in flowchart format, details of the cascading delete processing method of FIG. 3.

Referring to FIG. 4, a detailed flowchart of cascade delete processing method 400 in accordance with the invention is shown for a DB2 DBMS. Initially, load operations as discussed above are performed (block 305). It is noted that in a DB2 DBMS, load-time error records (hereinafter, PK error records) are written or logged to the SYSERR file—a DBMS-wide flat file. Following the load operations of block 300, the SYSERR file is sorted so that the PK error records generated during the acts of block 300 are convenient (block 405). For example, the SYSERR file may be sorted on error record type and TID and RID. If no unprocessed PK error records exist (the "No" prong of block 410), cascade delete processing is complete—any row determined to violate a referential constraint is deleted whereafter the table(s) are made available to the DBMS for general access (block 415).

If an unprocessed PK error record exists (the "Yes" prong of block 410), the first such record is obtained (block 420) and its TID and RID values are used to create an entry in a referential constraint error ("RCE") list (block 425). In one embodiment, the RCE is implemented as a stack data structure. The top-most RCE entry is then obtained (block 430) and processed to identify all child table rows that are invalid due to the PK error from which the RCE entry is based (block 435). That is, acts in accordance with block 435 identify cascading deletes—see discussion below regarding FIG. 5. If an unprocessed RCE entry exists (the "Yes" prong of block 440), processing loops to block 430. (As will be discussed below with respect to FIG. 5, RCE entry processing (block 435) may generate a number of RCE entries.) If no unprocessed RCE entry exists (the "No" prong of block 440), a secondary or FK error record is generated and written to the SYSERR log file for each existing RCE entry (block 445), whereafter the RCE list is cleared (block 450). Each time the acts of blocks 425-445 are performed, the RCE list includes an entry for each child table row that must be deleted because the row identified in the PK error record obtained during the acts of block 420 failed to load or was itself determined to be invalid due to a referential constraint violation. Following the acts of block 450, processing loops to block 410.

Figure 5:
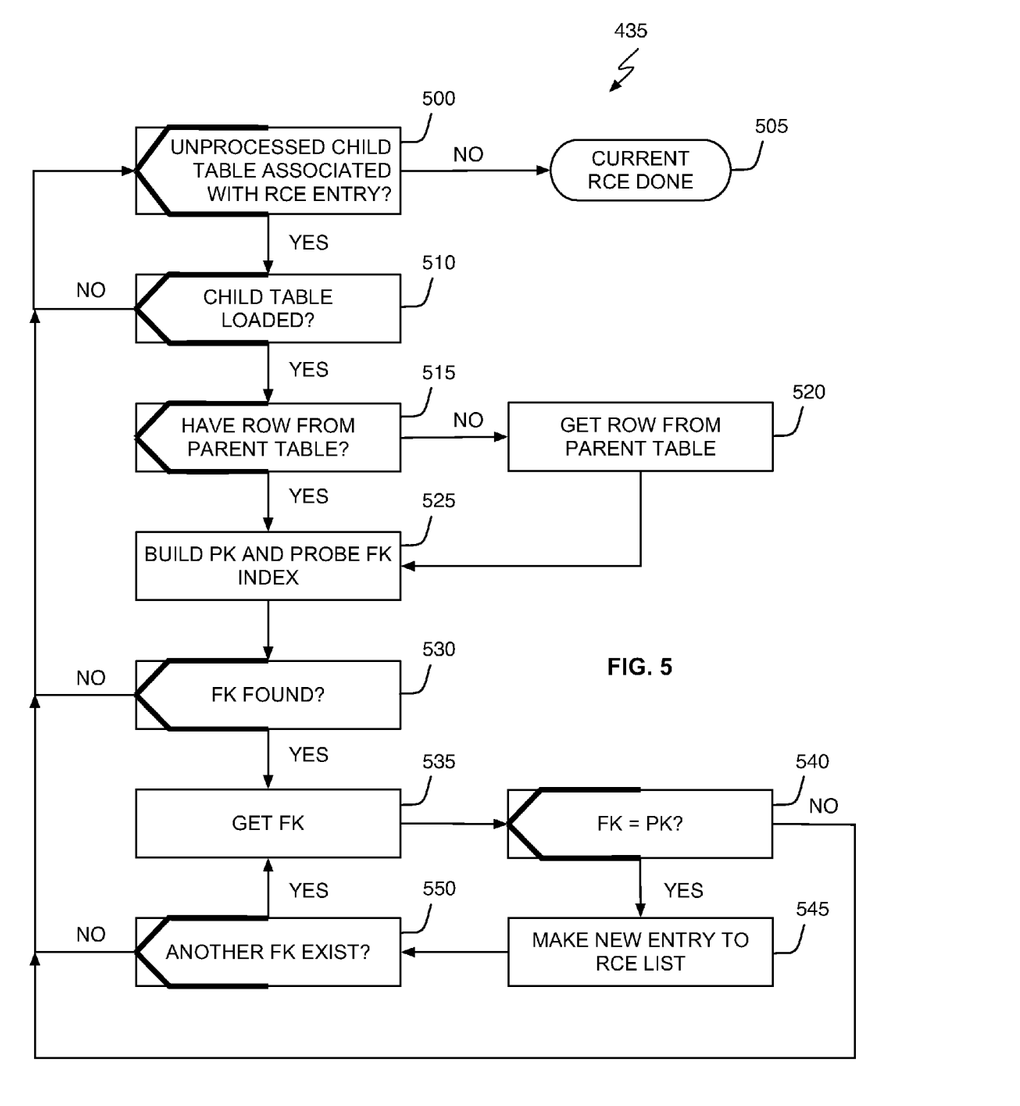

Referring to FIG. 5, each RCE entry is processed in accordance with block 435 as follows. A check is first made to determine if the table associated which the RCE entry has any dependent or children tables. (One of ordinary skill will recognize that this information is typically provided by the DBMS.) If the RCE has no associated dependent tables (the "No" prong of block 500), there can be no cascading deletes and the current RCE's processing is complete (block 505). If the RCE entry is associated with at least one dependent table (the "Yes" prong of block 500), a check is made to determine if the first of such one or more dependent tables has been loaded. If the dependent table has not been loaded (the "No" prong of block 510), a check is made to determine if another dependent table exists (block 500). If a dependent table exists and has been loaded (the "Yes" prong of block 510), a check is made to determine if the row identified by the RCE entry has previously been obtained. If the row identified by the RCE entry has not yet been obtained (the "No" prong of block 515), it is obtained (block 520). If the row identified by the RCE entry has already been obtained (the "Yes" prong of block 515), and after the acts of block 520, the row data is used to construct its PK (block 525). The PK is then used to probe the dependent table's FK index (built during the acts of block 300, see FIG. 4). If the PK probe indicates no FK was found (the "No" prong of block 530), no referential constraint violation for that dependent child table and RCE entry combination exists and processing continues at block 500. If the PK probe indicates a FK was found (the "Yes" prong of block 530), the FK is retrieved from the FK index (block 535) and a test is made to determine if the PK and FK are the same. If the PK and FK are not the same (the "No" prong of block 540), no referential constraint error exists and cascade delete detection processing for the current dependent table is complete—processing continues at block 500. If the PK and FK are the same (the "Yes" prong of block 540), a new RCE list entry is generated for the row associated with the FK obtained in accordance with block 535 (block 545). A test is then made to determine if the PK probe of the dependent table's FK index in accordance with block 525 identified more than one FK entry. If another FK entry exists and has not yet been processed (the "Yes" prong of block 550), the "next" FK is obtained in accordance with block 535 and processing continues at block 540. If another unprocessed FK entry does not exist (the "No" prong of block 550), cascade delete detection processing of the current dependent table is complete and processing continues at block 500.

Figure 6:
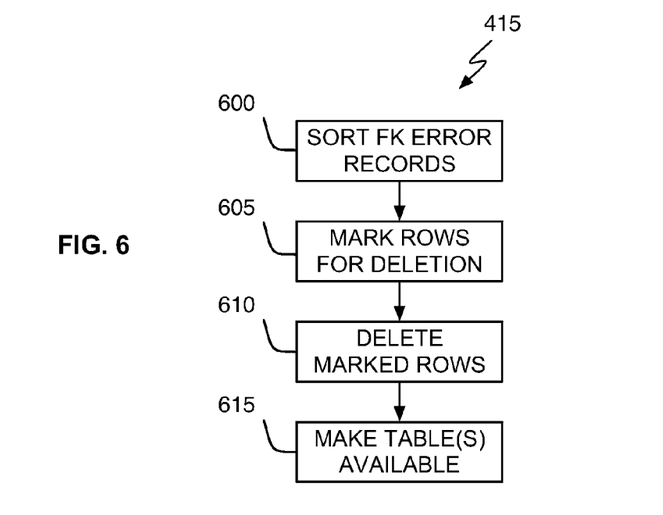

Referring to FIG. 6, an expanded description of the "Delete Rows" action of FIG. 4 is shown (see block 415). In one embodiment, all FK error records generated in accordance with cascade delete processing method 400 are sorted by TID and RID (block 600). The sorted list of FK error records facilitate the orderly identification or marking of rows that must be deleted from the data loaded in accordance with block 300 (block 605). Rows so marked are physically deleted from the affected table(s) (block 610) and the resulting "clean" tables are made available to the DBMS for general access (block 615). In another embodiment, all error records associated with cascade delete processing method 400 are sorted by TID and RID in block 605. While those rows associated with PK error records were not loaded and, therefore, do not need to be deleted, it has been found more time efficient to process all error records rather than to partition out only the FK error records.

Various changes in the details of the illustrated operational methods are possible without departing from the scope of the following claims. For instance, following the acts of block 435 and before the acts of block 440 (see FIG. 4), a FK error record could be generated for the "top-most" RCE list entry, whereafter the top-most RCE list entry could be deleted. If this embodiment is pursued, the acts of block 445 could be eliminated. It will be recognized that this alternative approach generates a FK error record as each RCE entry is processed while the method illustrated in FIG. 4 "batches" the generation of FK error records. Further, RCE processing methods (block 435) in accordance with the invention can record which child table rows have been identified for deletion such that if the RCE being currently processed identifies a row (RID) that has already been identified as needing to be deleted, processing of the current row (RID) can be assumed to be complete. It will similarly be understood that FK error records may be created "on the fly" during, or immediately following, the acts of block 545 (see FIG. 5) rather than the "batch" process contemplated by FIG. 4 at block 445. It will be recognized by those of ordinary skill in the art that the time to process referential integrity constraints in accordance with the invention is substantially equal to the time required to load the data because the time to sort and process error log files (typically sequential access files) is very small compared to the time to load the table data in accordance with block 305—this is particularly true for large tables.

In addition, acts in accordance with FIGS. 3-6 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description is presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

We claim:

1. A method to process cascading deletes in a relational database, comprising:
    loading one or more tables into memory, wherein each table comprises one or more rows and at least one of said tables is a parent table and at least one of said tables is a child table;
    obtaining a foreign key index for each loaded child table;
    logging, to an error file, primary key errors detected during loading the tables into memory;
    identifying the loaded rows that violate a referential constraint due to a primary key error using both the error file and the foreign key index for each loaded child table, wherein identifying the loaded rows that violate the referential constraint includes:
        obtaining from the error file a primary key record,
        determining a primary key value associated with the primary key error record, and
        using the primary key value to probe each foreign key index associated with a table that is dependent to the table associated with the primary key value to identify the loaded rows that violate the referential constraint;
    creating a foreign key error file that includes the identified rows;
    marking each identified row in the foreign key error file for deletion; and
    deleting the marked rows.

2. The method of claim 1, wherein the at least one parent table and the at least one child table comprise the same table.

3. The method of claim 1, wherein logging the primary key errors comprises writing a primary key error record for each row failing a data validation check operation.

4. The method of claim 3, further comprising writing a primary key error record for each duplicate primary key value detected.

5. The method of claim 3, wherein writing the primary key error record comprises writing an error record that includes a table identifier and a row identifier for the row.

6. The method of claim 5, further comprising writing an identifier identifying the error record as a primary key error record.

7. The method of claim 1, wherein creating the foreign key error file comprises:
    writing a foreign key error record for each identified row.

8. The method of claim 7, wherein writing the foreign key error record comprises writing an error record that includes a table identifier and a row identifier for the identified row.

9. The method of claim 8, further comprising writing an identifier identifying the error record as a foreign key error record.

10. The method of claim 1, further comprising sorting the error file based on a table identifier and row identifier associated with each error in the error file.

11. The method of claim 10, further comprising sorting the error file based on an identifier associated with each row identified in a foreign key error record, the sorting being performed prior to the act of deleting the marked rows.

12. The method of claim 10, further comprising making the one or more tables available for general access to a database management system.

13. The method of claim 1, wherein obtaining the foreign key index for each loaded child table comprises building a foreign key index for at least one of the loaded child tables.

14. The method of claim 1, wherein obtaining the foreign key index for each loaded child table comprises obtaining use of a prior built foreign key index for at least one of the loaded child tables.

15. A program storage device, readable by a programmable control device, comprising instructions stored thereon for causing the programmable control device to:
    load one or more database tables into memory, wherein each table comprises one or more rows and at least one of said tables is a parent table and at least one of said tables is a child table;
    obtain a foreign key index for each loaded child table;
    log, to an error file, primary key errors detected during loading the tables into memory;
    identify the loaded rows that violate a referential constraint due to a primary key error using both the error file and the foreign key index for each loaded child table, wherein the instructions to identify the loaded rows that violate the referential constraint include instructions to:
        obtain from the error file a primary key error record,
        determine a primary key value associated with the primary key error record,
        use the primary key value to probe each foreign key index associated with a table that is dependent to the table associated with the primary key value to identify the loaded rows that violate the referential constraint;
    create a foreign key error file that includes the identified rows;
    mark each identified row in the foreign key error file for deletion; and
    delete the marked rows.

16. The program storage device of claim 15, wherein the instructions to log primary key errors comprise instructions to write a primary key error record for each row failing a data validation check operation.

17. The program storage device of claim 16, further comprising instructions to write a primary key error record for each duplicate primary key value detected.

18. The program storage device of claim 16, wherein the instructions to write a primary key error record comprise instructions to write an error record that includes a table identifier and a row identifier.

19. The program storage device of claim 18, further comprising instructions to write an identifier identifying the error record as a primary key error record.

20. The program storage device of claim 15, wherein the instructions to create the foreign key error file comprise instructions to:
write a foreign key error record for each identified row.

21. The program storage device of claim 20, wherein the instructions to write a foreign key error record comprise instructions to write an error record that includes a table identifier and a row identifier.

22. The program storage device of claim 21, further comprising instructions to write an identifier identifying the error record as a foreign key error record.

23. The program storage device of claim 15, further comprising instructions to sort the error file based on the error records' table identifier and row identifier.

24. The program storage device of claim 23, further comprising instructions to sort the error file based on an identifier associated with each row identified in a foreign key error record, said instructions to sort being performed prior to the instructions to delete the marked rows.

25. The program storage device of claim 23, further comprising instructions to make the one or more tables available for general access to a database management system.

26. The program storage device of claim 15, wherein the instructions to obtain a foreign key index for each loaded child table comprise instructions to use of a prior built foreign key index for at least one of the loaded child tables.

27. The program storage device of claim 15, wherein the instructions to obtain a foreign key index for each loaded child table comprise instructions to use of a prior built foreign key index for at least one of the loaded child tables.

* * * * *